United States Patent [19]
Panzer et al.

[11] Patent Number: 5,119,223
[45] Date of Patent: Jun. 2, 1992

[54] BIDIRECTIONAL LIGHT WAVEGUIDE (LWG) TELECOMMUNICATION SYSTEM AND METHOD FOR WAVELENGTH SEPARATION MODE (BIDIRECTIONAL WAVELENGTH SEPARATION MODE (WDM) BETWEEN A CENTRAL TELECOMMUNICATION LOCATION AND PLURALITY OF DECENTRALIZED TELECOMMUNICATION LOCATIONS

[75] Inventors: Klaus Panzer; Thomas Neuhaus, both of Munich, Fed. Rep. of Germany

[73] Assignee: Siemens Aktiengesellschaft, Berlin and Munich, Fed. Rep. of Germany

[21] Appl. No.: 589,204

[22] Filed: Sep. 28, 1990

[30] Foreign Application Priority Data

Sep. 28, 1989 [EP] European Pat. Off. ........ 89117968.1

[51] Int. Cl.⁵ .......................... H04J 4/00; H04J 14/02
[52] U.S. Cl. .................................. 359/123; 359/114; 359/124; 359/135
[58] Field of Search ................. 370/3,1; 455/606, 607, 455/609, 610, 612; 359/114, 118, 123, 124, 125, 135, 137

[56] References Cited

U.S. PATENT DOCUMENTS

| | | | |
|---|---|---|---|
| 4,441,180 | 4/1984 | Schüssler | 370/3 |
| 4,726,010 | 2/1988 | Ali et al. | 370/3 |
| 4,748,689 | 5/1988 | Mohr | 370/3 |
| 4,775,971 | 10/1988 | Bergmann | 370/3 |
| 4,901,306 | 2/1990 | Gardner | 370/3 |
| 4,955,014 | 9/1990 | Kuppers et al. | 455/609 |

FOREIGN PATENT DOCUMENTS

| | | | |
|---|---|---|---|
| 0171080 | 2/1986 | European Pat. Off. | 370/3 |
| 0330190 | 8/1989 | European Pat. Off. | |
| 0350207 | 1/1990 | European Pat. Off. | |
| 3822803 | 5/1989 | Fed. Rep. of Germany | |
| 3825126 | 5/1989 | Fed. Rep. of Germany | 455/606 |
| 61-89735 | 5/1986 | Japan | |

Primary Examiner—Edward L. Coles, Sr.
Assistant Examiner—Kinfe-Michael Negash
Attorney, Agent, or Firm—Hill, Van Santen, Steadman & Simpson

[57] ABSTRACT

In a bidirectional light waveguide telecommunication system having a passive light waveguide bus network extending between a switching center and a plurality of subscriber locations, only the switching center is designed for a normal bidirectional wavelength division multiplex operation and is provided for this purpose with an electro-optical transmission element, an opto-electrical receiving element and an optical filter, whereas only a combined opto-electrical receiving-/electro-optical transmitting module that respectively works only in the time separation mode and is designed for emitting light having a wavelength for reception by the opto-electrical receiving element of the switching center is provided in the subscriber locations. In this combined receiving/transmitting module, the transmitting diode can be used, in alternation, as a receiving diode; alternatively thereto, the combined receiving-/transmitting module can be formed with a laser module provided with a laser diode transmitted and with a monitor photodiode which is used, in alternation, as a receiving diode.

9 Claims, 1 Drawing Sheet

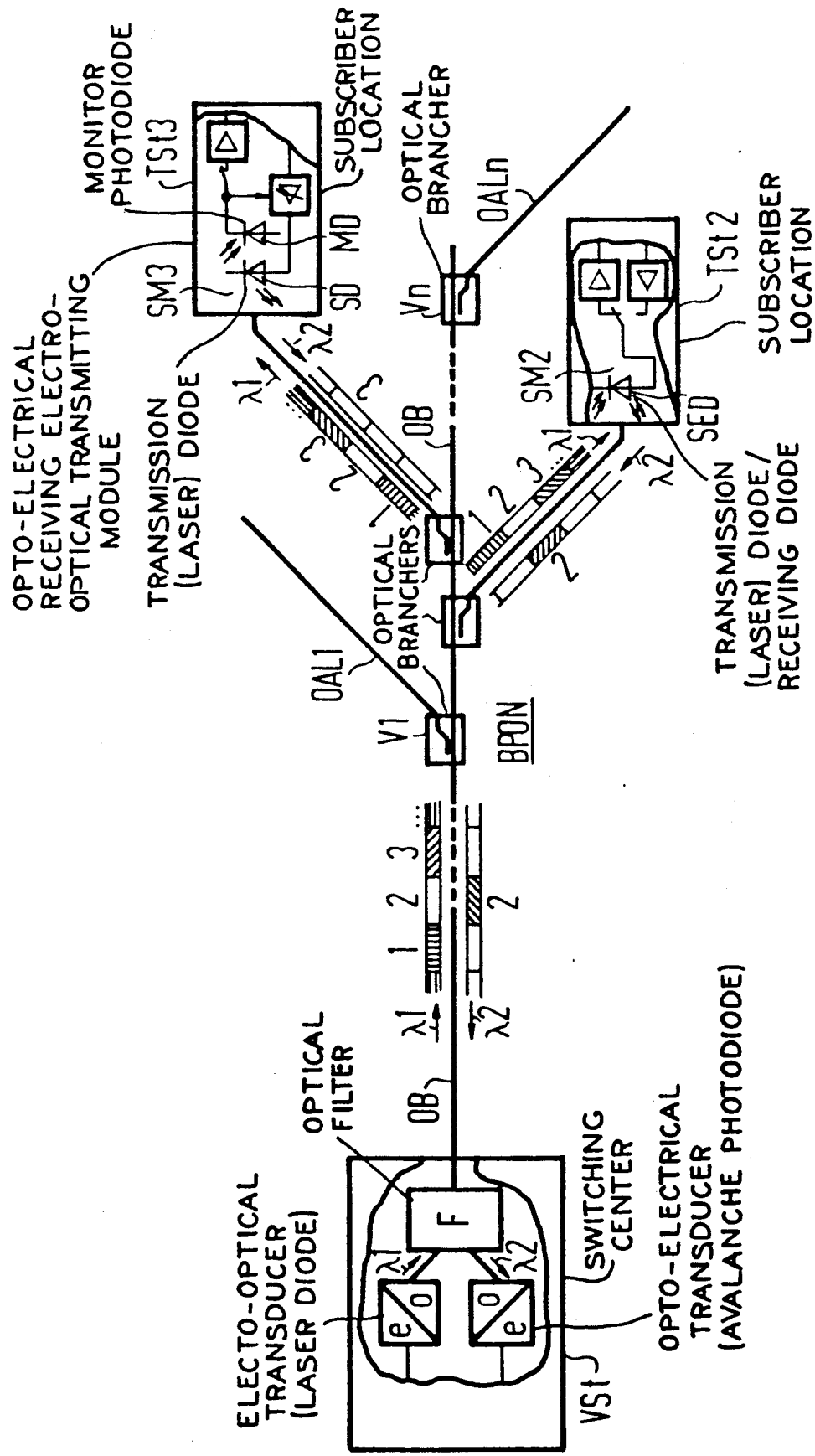

BIDIRECTIONAL LIGHT WAVEGUIDE (LWG) TELECOMMUNICATION SYSTEM AND METHOD FOR WAVELENGTH SEPARATION MODE (BIDIRECTIONAL WAVELENGTH SEPARATION MODE (WDM) BETWEEN A CENTRAL TELECOMMUNICATION LOCATION AND PLURALITY OF DECENTRALIZED TELECOMMUNICATION LOCATIONS

BACKGROUND OF THE INVENTION

1. Field of the Invention

The present invention relates to a bidirectional light waveguide telecommunication system for the wavelength separation mode using a passive light waveguide (LWG) bus network.

2. Description of the Prior Art

Recent developments in telecommunication technology have led to integrated services digital networks (ISDN) that have a star or bus structure of light waveguides (LWG) in the level of the subscriber lines. Such communication networks equipped with light waveguides are suitable for narrow-band and broad-band communication, as disclosed in the U.S. No. 3,980,831.

In a light waveguide telecommunication system, the light waveguide extending between two telecommunication locations can be utilized in both transmission directions, in particular upon utilization of, for example, separating routing filters constructed with a partially-reflecting mirror or with an (integrated optical) directional coupler (see Zurich Seminar '86 CONF. Papers, B3, #1 in Table 1), being utilized in the wavelength-isoposition mode or in the wavelength separation mode, i.e. in what is referred to as bidirectional wavelength-division multiplex (WDM) utilizing appropriate wavelength filters (again see Zurich Seminar '86 CONF. Papers, B3, #3 in Table 1), in that the light waves having a shorter wavelength are used for the signal transmission via the optical fibers (preferably monomode) in the one transmission direction and light waves having a longer wavelength are employed for the signal transmission in the opposite transmission direction. In both instances, appropriate optical separating filter modules are to be provided at both ends of the light wave guide, these modules respectively effecting a separate light-guiding connection from the light waveguide to the respective opto-electric transducer and from the respective electro-optical transducer to the light waveguide. Separating routing filters can also be employed in combination with a time separating transmission mode (see Zurich Seminar '86 CONF. Papers, B3, #4.1 in Table 1), whereas, conversely, no additional separating routing filters are to be provided in a time separation transmission mode when the light-emitting diode serving as a transmitter in each of the two telecommunication locations is also used in alternation as a receiving diode that receives the signals coming from the other telecommunication location during the transmission pauses (Japanese Patent 61-89735; Zurich Seminar '86 CONF. Papers, B3, #4.3 in Table 1; German patent 3 822 803; European patent 0 330 190) or, as well, when a monitor photodiode is utilized in alternating fashion as a receiving diode (German patent 3 825 126).

The introduction of new telecommunication systems having LWG central office lines is quite generally dependent on the nature and scope of the pre-existing telecommunication infrastructures having telecommunication services offered therein and on the demand for new broad-band communication services. The potentially greatest market volume is thereby envisioned in the area of private household; this market potential, however, will not take on corporeal form as an effective market demand without correspondingly-low costs of a broad-band subscriber terminal.

It is known, for example, from the European patent 0 171 080 in this context to provide only a single, common light waveguide (LWG) terminal having a respectively shared electrooptical transmission element and optoelectrical reception element for a plurality of (decentralized) subscriber locations in their switching center, whereby a passive LWG bus network provided with optical branchers extends between the common LWG terminal of the switching center and the decentralized subscriber locations. The expense with respect thereto is therefore correspondingly reduced in the switching center, but the expense at the subscriber side is not correspondingly reduced.

SUMMARY OF THE INVENTION

In a bidirectional LWG telecommunication system having wavelength division operation (bidirectional WDM) between a central telecommunication location and a plurality of decentralized telecommunication locations, the object of the present invention is to provide a manner of obtaining a further, noticeable limitation of expense.

The present invention is directed to a bidirectional LWG telecommunication system for wavelength separation operation (bidirectional WDM) between a central telecommunication location and a plurality of decentralized telecommunication locations, preferably having a passive LWG bus network extending between a switching center and a plurality of subscriber locations. This telecommunication system, according to the present invention, is characterized in that an electro-optical transmission element and an opto-electrical receiving element are provided only in the central telecommunication location, these being designed for the wavelength separation operation, whereas only a respective, combined opto-electrical receiving/electro-optical transmitting module that is free of wavelength filters, works in the time separation mode and is designed for the emission of light having a wavelength for whose reception the central telecommunication location is equipped is provided in the decentralized telecommunication locations connected to the central telecommunication location.

In a bidirectional LWG telecommunication system, the present invention yields the advantage of enabling a wavelength separation mode (bidirectional WDM) between a central telecommunication location and a plurality of decentralized telecommunication locations without having to respectively provide a separate receiving diode with the appertaining fiber coupling in the decentralized telecommunication locations for that purpose. The additional elimination of a wavelength-selective element also simultaneously yields the elimination of the additional attenuation caused as a result thereof, so that at least one part of the intrinsically-diminished receiving sensitivity in the decentralized telecommunication locations is recaptured.

BRIEF DESCRIPTION OF THE DRAWING

Other objects, features and advantages of the invention, its organization, construction and operation will be best understood from the following detailed description, taken in conjunction with the accompanying drawing, on which there is a single figure which is a schematic representation of an exemplary embodiment of a telecommunication system constructed in accordance with the present invention.

DESCRIPTION OF THE PREFERRED EMBODIMENTS

Referring to the drawing, there is schematically illustrated a bidirectional LWG telecommunication system having a passive (preferably monomode) LWG bus network BPON that extends between a switching center VST and a plurality of subscriber locations ..., TSt2, TSt3, ..., illustrating the same in a scope necessary for an understanding of the invention. In this LWG telecommunication system, the subscriber locations ..., TSt2, TSt3 ..., form a plurality of decentralized telecommunication locations that are connected via a single fiber LWG bus OB to a common LWG terminal of the switching center VSt that forms a central telecommunication location. Let the subscriber-associated LWG lines OAL1—OALn thereby be connected to the appertaining LWG bus OB via passive, i.e. non-wavelength-selective, optical branchers V1—Vn, namely either directly, as explicityly shown on the drawing, or via further branchers of the same type. For example, transit mixers or integrated optical directional couplers can thereby be employed as optical branchers.

A wavelength separation mode (bidirectional wavelength division multiplexing) is provided for separating directions in the telecommunication system shown on the drawing, in that light of a first wavelength $\lambda 1$ lying, for example, in the 1300 nm band is employed for signal transmission in the downstream direction from the central telecommunication location VSt to the decentralized telecommunication locations ... TSt2, TSt3 ..., and light of a somewhat longer, second wavelength $\lambda 2$ lying, for example, in the 1500 nm band, is employed for signal transmission in the upstream direction from the decentralized telecommunication locations ..., TSt2, TSt3 ..., to the central telecommunication location VSt. To this end, an appropriate electro-optical transducer e/o advantageously formed by a laser diode and a corresponding opto-electrical transducer e/o advantageously formed by an avalanche photodiode are provided in the switching center VSt that forms the central telecommunication location, these transducers being connected to the appertaining LWG bus OB via a wavelength-selective, optical filter F, for example an optical separating filter module provided with an interference beam splitter that is already known in the art from, for example, U.S. Pat. No. 4,790,616, fully incorporated herein by this reference.

Differing from the (central) switching center VSt, only a combined opto-electrical receiving/electro-optical transmitting module SM that works in the time separation mode is provided in the decentralized telecommunication locations, namely in the subscriber locations ..., TSt2, TSt3, ..., this combined module being enabled by a corresponding transmission diode, for example a laser diode, to output light having a wavelength $\lambda 2$ for whose reception the opto-electrical transducer e/o of the switching center VSt is equipped. As indicated on the drawing for the transmitting diode SED of the subscriber location TSt2, this laser diode in an advantageous development of the invention is then also utilized, in alternation, as a receiving diode for the reception of the light having the wavelength $\lambda 1$. In the receiving mode, laser diodes are, in fact, not entirely as good as standard receiving diodes; however, reception sensitivities that are definitely still usable can be achieved.

In an alternative development of the invention as indicated at the subscriber location TSt3 on the drawing, the combined opto-electrical receiving/electro-optical transmitting module SM can also be formed with a laser module provided with a monitor photodiode MD for regulating the light power, whereby the monitor photodiode MD is used, in alternation, as a receiving diode.

As indicated on the drawing, the signal transmission from the switching center VSt proceeds downstream to the subscriber locations ..., TSt2, TSt3, ..., in such a fashion that all subscriber locations ..., TSt2, TSt3, ..., all receive bit packets 1, 2, 3, ... transmitted by the switching center TSt, whereby, however each subscriber location, in fact, only accepts packets intended therefor in a known manner, for example based on addressing.

In the opposite transmission direction, the signal transmission from the subscriber location ... TSt2, TSt3 ..., upstream to the switching center VSt proceeds in such a fashion that, as likewise known per se, the individual subscriber locations each respectively have a defined transmission time slot for the transmission of bit packets allocated thereto, so that the bit packets do not overlap on the LWG bus. The combined opto-electrical receiving/electro-optical transmitting module SM of the appertaining subscriber location (TSt) may potentially be in the transmission condition only given non-occupation of the LWG bus network BPON with a packet proceeding to the appertaining subscriber station in the downstream direction, so that a packet transmitted by the appertaining subscriber location (for example the location TSt2) is transmitted in the upstream direction to the switching center VSt, as likewise indicated on the drawing for a packet 2 of the subscriber location TSt2. Outside of the transmission time slot allocated to the appertaining subscriber location, the combined receiving/transmitting module SM is always in the receiving condition, as is likewise indicated on the drawing. A corresponding control of the transmission execution can be effected within the framework of the transmission control at the subscriber side that must already be provided in a known manner in order to avoid an overlap of packets of various subscriber locations transmitted in the upstream direction (known, for example, from the European patent 0 171 080); this, however, need not be set forth in greater detail herein since it is not required for an understanding of the invention.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A method for bidirectional wavelength division multiplex operation between a central telecommunication location and a plurality of decentralized telecommunication locations of a bidirectional light waveguide telecommunication system comprising a passive light waveguide bus network extending between a central switching center and a plurality of subscriber locations, comprising the steps of:

simultaneously operating an electro-optical transmitting element and an opto-electrical receiving element in the wavelength separation mode only in the central telecommunication location; and operating a combined opto-electrical receiving/electro-optical transmitting module in each of the decentralized telecommunication locations in the time separation mode and without wavelength filters, to emit light with a wavelength to be received at the central switching center by the opto-electrical receiving element.

2. The method of claim 1, comprising the steps of:

operating a laser diode in the combined opto-electrical receiving/electro-optical transmitting module of the respective decentralized telecommunication, locations alternatively as a transmitting diode and as a receiving diode.

3. The method of claim 1, and further comprising the step of:

operating a monitor photodiode of a laser module in the respective decentralized telecommunication locations alternately as a monitor photodiode and as a receiving diode in the respective combined opto-electrical receiving/electro-optical transmitting module.

4. Apparatus for bidirectional wavelength division multiplex operation between a central telecommunication location and a plurality of decentralized telecommunication locations of a bidirectional light waveguide telecommunication system, comprising a passive light waveguide bus network extending between a switching center of the central telecommunication location and a plurality of subscriber locations, comprising:

an electro-optical transmitting element and an opto-electrical receiving element each coupled to the waveguide bus network in the central telecommunication location;

means for simultaneously operating said electro-optical transmitting element and said opto-electrical receiving element in the wavelength separation mode only in the central telecommunication location;

a plurality of combined opto-electrical receiving-/electro-optical transmitting modules each in a respective decentralized telecommunication location; and means for operating said combined opto-electrical receiving/electro-optical transmitting modules in each of the decentralized telecommunication locations, in the time separation mode and without wavelength filters, to emit light with a wavelength to be received at the central telecommunication location by the opto-electrical receiving element.

5. The apparatus of claim 4, wherein:

each of said combined opto-electrical receiving/electro-optical transmitting modules comprises a laser diode; and said apparatus comprising means for operating said laser diode alternately as a transmitting diode and as a receiving diode.

6. The apparatus of claim 4, wherein:

each of said combined opto-electrical receiving/electro-optical transmitting modules comprises a monitor photodiode; and said apparatus comprising means for operating said monitor photodiode alternately as a monitor photodiode and as a receiving diode.

7. A bidirectional light waveguide telecommunication system for operation in the wavelength separation mode, comprising:

a central telecommunication location;

a plurality of decentralized telecommunication locations;

a passive light waveguide bus network extending between said central telecommunication location and said plurality of decentralized telecommunication locations;

an electro-optical transmission element and an opto-electrical receiving element designed for and operated in the wavelength separation mode only in said central telecommunication location and coupled to said passive light waveguide bus network; and a plurality of combined opto-electrical receiving-/electro-optical transmitting modules each in a respective decentralized telecommunication location coupled to said passive light waveguide bus network free of wavelength filters, each of said modules designed for and operated to transmit light in the time separation mode with a wavelength for reception by said opto-electrical receiving element of said central telecommunication location.

8. The telecommunication system of claim 7, wherein:

each of said combined opto-electrical receiving/electro-optical transmitting modules comprises a laser diode operated alternately as a transmitting diode and as a receiving diode.

9. The telecommunication system of claim 7, wherein:

each of said combined opto-electrical receiving/electro-optical transmitting modules comprises a laser module including a monitor photodiode operated alternately as a monitor diode and as a receiving diode.

* * * * *